Nov. 10, 1959     H. G. BAUER     2,911,870
ORGAN REED SUPPORT AND ASSEMBLY
Filed May 21, 1953     3 Sheets-Sheet 1
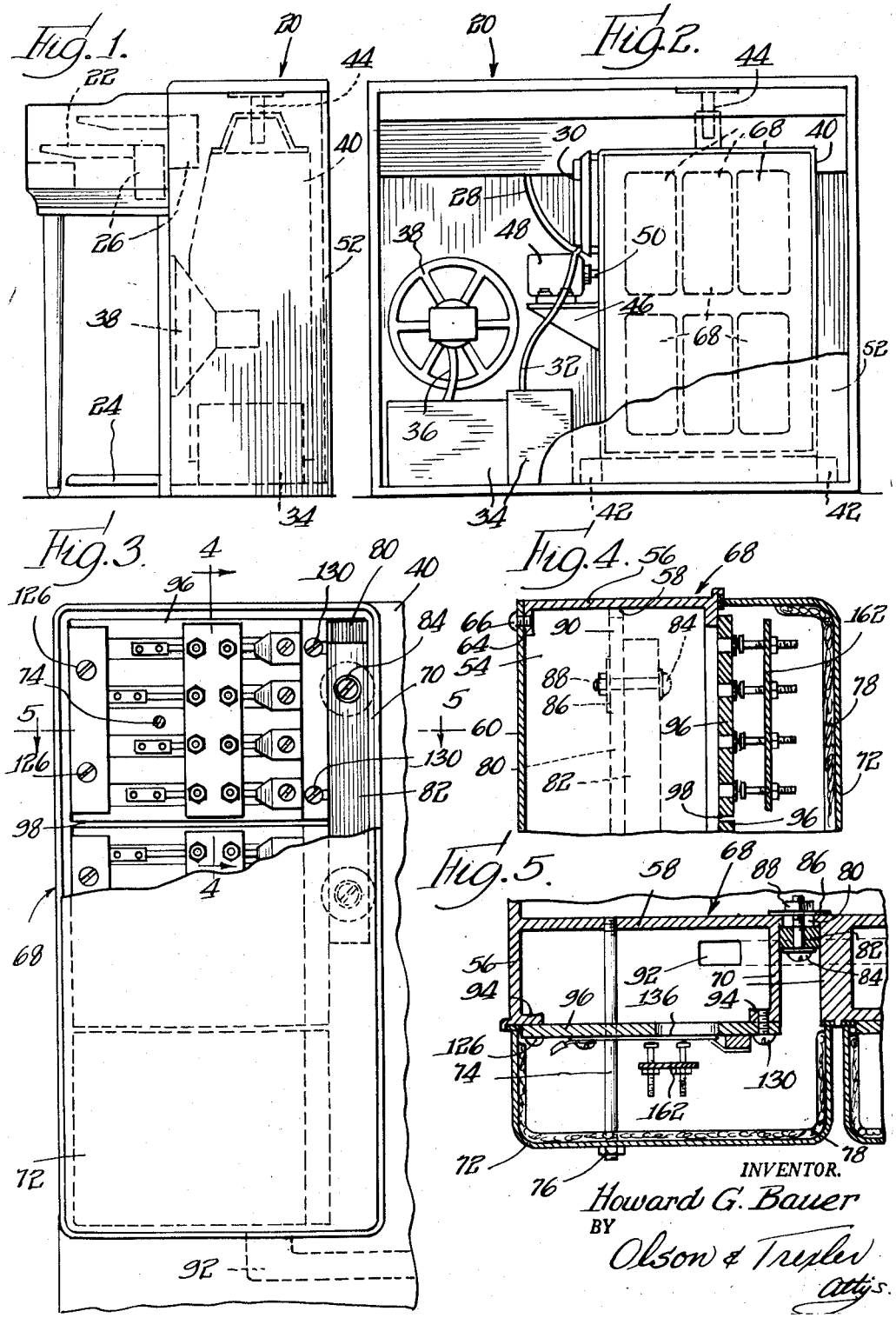
INVENTOR.
Howard G. Bauer
BY
Olson & Trexler
Attys.

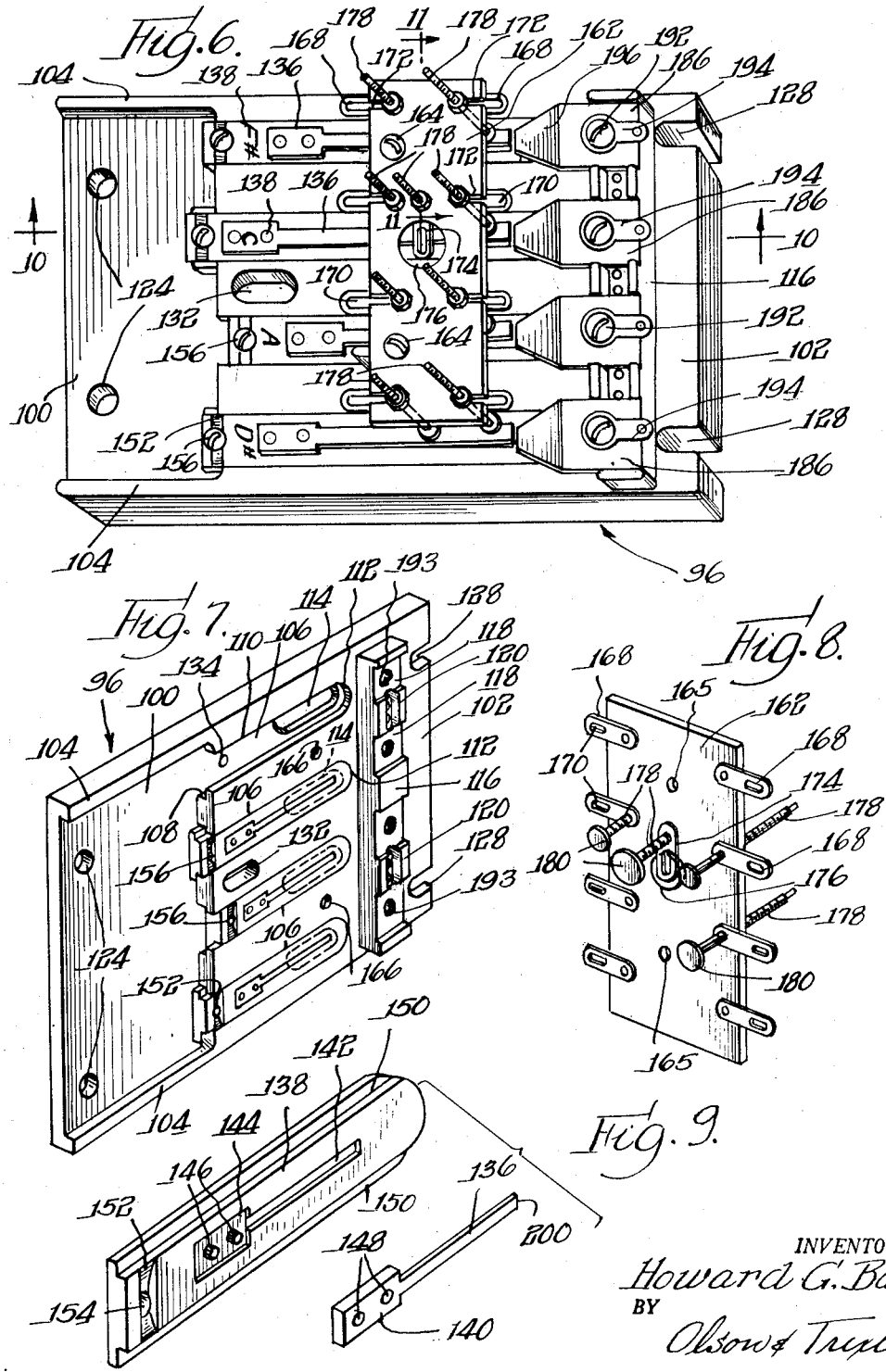

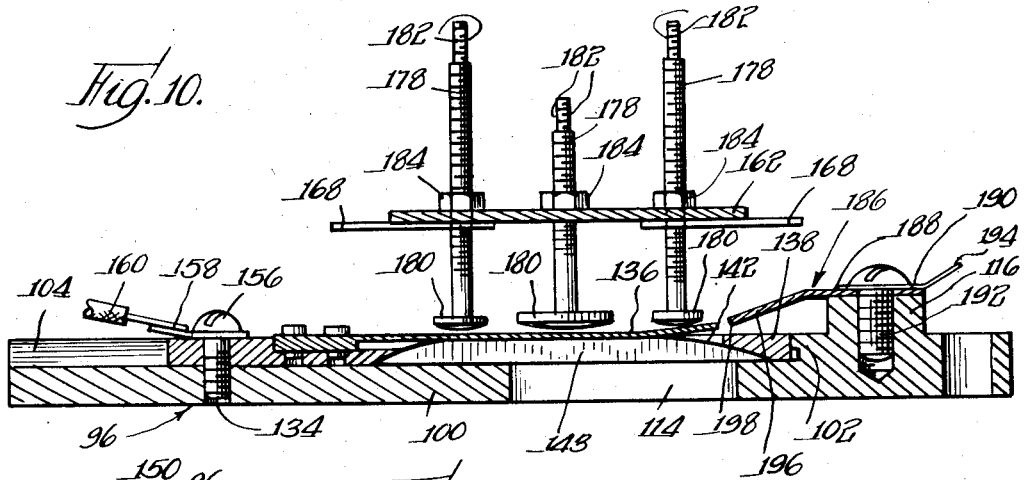
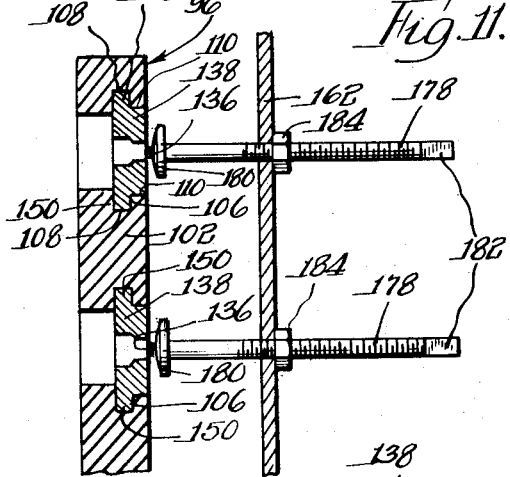
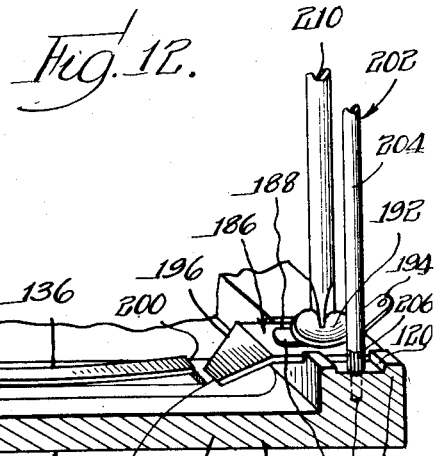
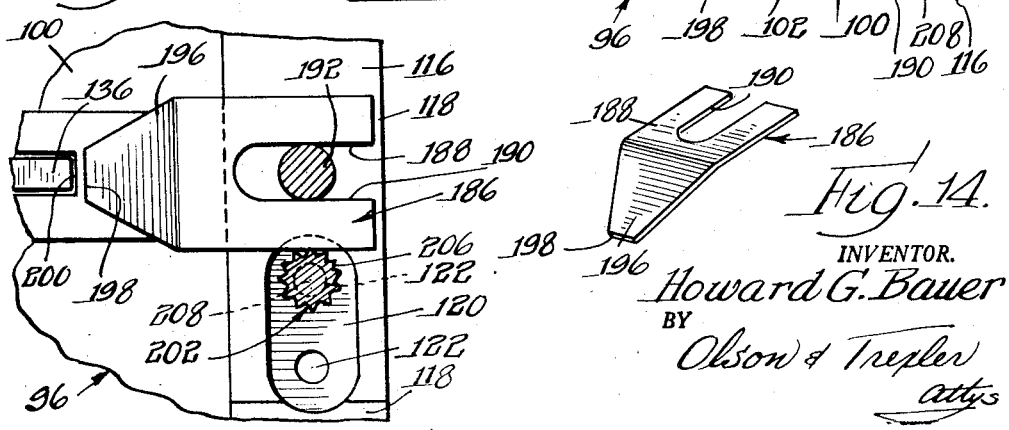

United States Patent Office 2,911,870
Patented Nov. 10, 1959

2,911,870

ORGAN REED SUPPORT AND ASSEMBLY

Howard G. Bauer, Tonawanda, N.Y., assignor to The Rudolph Wurlitzer Company, North Tonawanda, N.Y., a corporation of Ohio Application May 21, 1953, Serial No. 356,409

5 Claims. (Cl. 84—1.14)

This invention is concerned generally with an electronic organ and more particularly with reed generators therefor.

Many types of electronic organs are now in use. Of these many types, it has been found that the most natural, organ-like tones are produced by the type using vibrating reeds as generators. In such organs, a metallic reed is spaced from a pick-up element, the reed and pick-up element forming the plates of a capacitor. The spacing, and hence the capacitance varies as the reed vibrates. When a potential is applied between the reed and pick-up element, an electrical oscillation is generated which, when suitably amplified and applied to a loudspeaker, produces a remarkably life-like organ tone.

It is an object of this invention to provide improved means for mounting tone generating reeds in an electronic organ.

It is a further object of this invention to provide a unit assembly for mounting electronic vibrating reeds whereby groups of reeds can be handled, such as for pretuning, before insertion in the organ.

A further object of this invention is to provide a reed mounting block wherein reeds are easily mounted and demounted, and particularly wherein the reeds are held fixedly in place to prevent shifting and consequent generation of spurious tones.

A further object of this invention is to provide vibrating reeds and pick-ups and mounting means therefor such that the total capacity will be quite low so that the variation in capacity effected by vibration of the reeds will have the greatest possible effect.

More specifically, it is an object of this invention to provide vibrating reeds and pick-ups wherein the capacity between reeds and pick-ups is high and the capacity between the pick-ups and the reed mounting frames is low.

A further object of this invention is to provide, in an electronic organ, a vibrating reed generator and pick-up wherein the pick-up is shaped to conform to the swing of the reed.

A still further object of this invention is to provide, in an electronic organ, vibrating reeds and associated pick-ups which are so constructed and arranged as to avoid in large measure the necessity of shaping circuits for providing the different banks of organ sounds.

Another object of this invention is to provide, in an electronic organ, a vibrating tone generator having a plurality of pick-ups spaced longitudinally of the reed for picking up oscillations from different parts of the reed, different parts of the reed vibrating in a different manner.

A more specific object of this invention is to provide, in an electronic organ, a vibrating reed tone generator and a pick-up element spaced longitudinally from the end of the reed.

Another object of this invention is to provide, in combination, a vibrating reed generator and a pick-up spaced longitudinally from the end of the reed, wherein the pick-up is wider than the reed to compensate for end play of the reed.

Yet another object of this invention is to provide, in an electronic organ, unique means for adjusting the spacing of an end pick-up from a vibrating reed.

Other and further objects of the present invention will be apparent from the following description when taken in connection with the accompanying drawings wherein:

Fig. 1 is an end view of an electronic organ embodying the principles of the invention;

Fig. 2 is a rear view of the organ shown in Fig. 1;

Fig. 3 is an enlarged view of a reed compartment or octave box with a portion thereof broken away for clarity of illustration;

Fig. 4 is a vertical sectional view through the reed compartment or octave box taken along the line 4—4 of Fig. 3;

Fig. 5 is a horizontal sectional view through the same as taken along the line 5—5 of Fig. 3;

Fig. 6 is a perspective view of the reed block and associated reeds and pick-ups forming the subject matter of this invention;

Fig. 7 is a perspective view of the reed block with the pick-ups and one of the reeds removed therefrom;

Fig. 8 is a perspective view of certain of the pick-ups and the mounting means therefor;

Fig. 9 is an exploded perspective view of one of the reeds and the associated frame;

Fig. 10 is a sectional view taken longitudinally of one of the reeds along the line 10—10 of Fig. 6;

Fig. 11 is a fragmentary sectional view through the reeds and block as taken along the line 11—11 of Fig. 6;

Fig. 12 is a perspective view illustrating the adjustment of the end pick-up;

Fig. 13 is an enlarged top view showing the adjustment of Fig. 12; and

Fig. 14 is a perspective view of the end pick-up.

Referring now to the figures in greater particularity, an organ embodying the principles of the invention disclosed herein comprises a cabinet 20 of more or less conventional design having a pair of keyboards 22 and a pedal manual 24. Suitable housings 26 are provided behind the keyboards 22, and individual wires connected individually to the keys extend through a cable 28 to a plurality of filters 30 on a filter board and thence through a cable 32 to suitable electronic amplifying and power supply means 34. Suitable connections (not shown) likewise lead from the pedal manual 24 to the electronic amplifier and power supply means 34. Suitable connections as shown at 36 are made from the electronic amplifier and power supply means to a loudspeaker 38 for producing audible organ tones.

A reed box 40 of sound insulating material is supported within the organ cabinet 20 from below as at 42 and from above as at 44. These supports preferably include springs, or rubber, or other resilient means for preventing the transmission of audible vibrations from the reed box to the cabinet or other solid members that might tend to resonate and amplify such vibrations. A bracket 46 on the side of the reed box supports a motor 48 having a shaft 50 extending into the reed box for driving a blower (not shown) which preferably is a centrifugal blower. The rear of the organ cabinet preferably is closed by a sheet 52 of sound deadening material for preventing the transmission of audible sounds from the cabinet other than from the loudspeaker 38.

The reed box 40 is provided along its front edge with an air chamber 54 (Fig. 4) defined by the peripheral wall 56 of the reed box, by an intermediate wall 58 (Figs. 4 and 5) formed integral with the peripheral wall, and by a plate 60 secured to inturned flanges 64 on the peripheral wall by any suitable means such as screws 66.

A plurality of reed compartments or octave boxes 68 is formed to the rear of the air chamber 54, partly by the peripheral wall 56 and intermediate walls 70, and partly by removable dished out lids or covers 72 held in place by means such as studs 74 threaded into the intermediate plate 58 and projecting through the lids 72, nuts 76 being threaded on the outer ends of the studs. The lids or covers 72 preferably are formed of sheet metal and are lined with sound deadening or insulating material 78.

Each of the reed compartments or octave boxes 68 includes an octave of reeds as will hereinafter be brought out in detail. Musically adjacent octaves may be spaced away from one another positively to preclude interaction between the reeds of adjacent octaves.

Elongated openings 80 (Figs. 3, 4, and 5) are provided into each of the reed compartments from the air chamber 54, and elongated blocks 82 are held in place over these openings by bolts 84 passing through the blocks and through washers 86 of greater diameter than the width of the slots 80. Nuts 88 are threaded on the outer ends of the bolts 84 for clamping against the washers 86 to hold the blocks 82 in predetermined position. The blocks are longitudinally adjustable by loosening the nuts 88 on the bolts 84 to determine the air entrance space in accordance with the air volume of the reeds. As will be understood, reeds for the lower octaves are larger than those for the higher octaves and therefore require larger volumes of air. Air return passages 92 (Fig. 5) are provided for returning air from the reed compartments or octave boxes and like the air entrance spaces through the slots 80 are open at all times. Therefore, the reeds are vibrated continuously when the organ is in operation. Suitable electrical connections are made upon depression of the various keys to cause the reeds to sound, these connections not being pertinent to the present invention.

Inwardly directed peripheral flanges 94 are provided in each reed compartment or octave box 68 along the edges of the peripheral wall 56 and the intermediate walls 70 for mounting reed blocks 96. There are three such reed blocks provided for each octave box, and as may be seen from Figs. 3 and 4, the blocks are spaced apart a slight distance as at 98. This spacing varies from one reed compartment or octave box to another to by-pass a predetermined part of the air passing through each compartment in accordance with the air pressure requirements of the reeds therein.

Each reed block 96 as best seen in Figs. 6, 7, and 10-12 comprises a relatively flat, rectangular base or plate 100 made of Bakelite or other suitable insulating material. Somewhat over half of the reed block 96 is raised or enlarged as at 102, and flanges 104 extend along the edges of the base 100 from the raised portion 102. The raised portion 102 is provided with a plurality, four in this illustrative embodiment, of elongated recesses 106 which are undercut as at 108 to provide longitudinal flanges 110. The bottoms of the recesses 106 are coplanar with the top of the base 100, and the inner ends of the recesses are curved or rounded off as at 112. These ends likewise may be undercut. Elongated openings 114 are provided through the base 100 in alignment with the recess 106 and adjacent the inner ends 112 thereof.

Each reed block 96 further is provided with a trumpet pick-up support 116 in the form of a ridge of rectangular cross section on top of the raised portion 102 and extending transversely of the block substantially from edge to edge. The trumpet pick-up support is provided with a plurality of recesses 118 equal in number to recesses 106 and each aligned with one of these recesses for receiving a trumpet pick-up as will be brought out hereinafter. Between the two outer recesses 118 toward each end of the support 116 there is provided a substantially oval recess 120 of substantially greater depth than the recesses 118 and extending part way into the recesses 118. Each of the recesses 120 is provided in its bottom with a pair of circular holes 122 (Fig. 13) which preferably are concentric with the rounded ends of the oval recesses 120. These holes are provided for adjusting the trumpet pick-ups as will be apparent hereinafter.

The blocks 96 further are provided with a pair of apertures 124 (Figs. 6 and 7) in the base 100 for receipt of mounting screws 126 (Figs. 3 and 5) and with a pair of recesses 128 (Figs. 6 and 7) for receipt of mounting screws 130 (Figs. 3 and 5). The block further is provided with an opening 132 (Figs. 6 and 7) for permitting passage of the stud 74 which holds the lids or covers 72 in place. Within each recess 106 there is also provided an aperture 134 (Figs. 7 and 10) for a purpose to be described shortly.

Each of the blocks 96 carries a plurality of vibratory reeds 136 and associated reed frames 138. The reeds, as best may be seen in Fig. 9, are formed with relatively wide and thickened portions 140 at their rear ends for mounting or for attachment to their associated frames. Each reed frame 138 is provided with an elongated slot 142 which is just slightly larger than the vibratile tongue of the associated reed 136. The slot 142 opens along its under side into an enlarged recess 143 for facilitating proper air passage. A recessed portion 144 may be provided for receiving the base portion 140 of the reed. The reed base portion may be affixed to the frame 138 by any suitable means such as rivets or screws, but preferably the frame is provided with a pair of integral studs 146 struck up above the surface of the frame by punching the under side thereof, these studs being received in corresponding openings 148 in the reed mounting base and peened over. The reed frames 138 are long and flat and are generally complementary to the recesses 106 and undercut portions 108 of the block. To this end, the reeds are provided with lateral extending flanges 150 along their longitudinal edges which fit in the recesses 108 of the blocks and underlie the flanges 110.

The reed frames and the reeds carried thereby therefore readily may be slid in and out of position in the block. To facilitate withdrawal of the reeds and frames, the frames are provided near their rear ends with transverse recesses 152 across their upper surfaces for receipt of a tool. The reed frames are provided with threaded apertures 154 at the centers of the recesses 152, and these recesses receive screws 156 to hold lugs 158 (Fig. 10) on lead wires 160 to the reed frames. The screws 156 project down into the apertures 134 in the block, these apertures preferably being threaded, so that the reeds and frames cannot be moved accidentally after insertion.

Pick-up means are provided for cooperation with the reeds and include a rectangular sheet 162 of fiber, plastic, or other suitable insulating material. The sheet is mounted above the vibratile tongue portions of the reeds by means of a pair of screws 164 (Fig. 6) extending through holes 165 (Fig. 8) in the sheet and through cylindrical spacers (not shown) and threaded into tapped apertures 166 (Fig. 7) in the reed blocks 96. The sheet 162 is provided along its opposite longitudinal edges with metallic tabs or connectors 168 which are affixed to the sheet by means of eyelets or hollow rivets formed integral with the tabs or connectors 168. These hollow rivets or tabs pass through suitable openings in the sheet and are peened over at their outer edges. The tabs 168 are provided adjacent their outer ends with suitable elongated openings 170 for receiving lead wires. The sheet is provided with slots 172 (Fig. 6) aligned with the openings 170 to provide clearance for lead wires. In general, the tabs 168 and associated eyelets or hollow rivets are provided in pairs and are spaced according to certain requirements as will be brought out hereinafter. An exception occurs between a pair of tabs 168 spaced relatively toward the center wherein there is provided a third connector or tab 174 of a configuration similar to those previously disclosed, the eyelet or hollow rivet of this tab being located substantially midway between the adjacent pair of eyelets or hollow rivets and on the median line of the sheet. The tab 174 has its apertured end extending over a relatively large circular opening 176 at the center of the sheet 162 to provide clearance for attaching a lead wire.

Tone screws 178 are threaded through the hollow rivets or eyelets of the tabs or connectors 168 or 174 and are provided with heads 180 which are juxtaposed to the reeds. The tone screw nearest the free end of the reed is the longer or the longest in each instance to provide for the greatest range of adjustment as is necessary because of the greater vibrational swing of the end of the reed. There are two tone screws associated with each of the reeds 136 except for the one instance when the extra tab 174 is provided, there being three tone screws 178 associated with the adjacent reed. The diameters of the screw heads vary in accordance with the size of the reed and the type of tone to be generated, i.e. a flute tone or a diapason tone, etc. The bottom faces of the tone screw heads are curved or rounded off in order to conform to the reeds as they vibrate for the closest possible spacing without actual contact.

The eyelets or bushings associated with the tabs 168 and 174 may be prethreaded, but preferably are tapped by the associated screws 178. To this end, the free ends of the screws 178 are slabbed to provide flats 182 (Fig. 11) which serve to provide sharp cutting edges on the reeds and which also are engageable with a wrench for final adjustment of the tone screws. Nuts 184 are threaded on to the screws 178 for clamping against the respective eyelets or hollow rivets positively to lock the screws in adjusted position.

Trumpet pick-ups 186 are provided on the trumpet pick-up support 116 and comprise thin sheet metal plates 188 having longitudinal slots 190 (Figs. 10, 12, 13, and 14) therein. These plates 188 fit in the recesses 118 of the trumpet pick-up support 116 and are held in place by screws 192 passing through the slots 190 and threaded into suitable openings 193 (Fig. 7) in the trumpet pick-up support. Sheet metal tabs or electrical connectors 194 also encircle the screws and are clamped against the top faces of the trumpet pick-ups 186 for connection to suitable lead wires.

The trumpet pick-ups are provided with down-turned noses 196 tapering to flat ends or tips 198 which are positioned just above the reed frames 138 and adjacent the free ends 200 of the reeds.

In order to prevent interaction between adjacent reeds which might produce beat notes and which might tend to beat off frequency, musically adjacent reeds are physically spaced apart. For instance, in Fig. 6 the top reed is illustrated as F♯, the second reed is illustrated as C, the third reed is illustrated as A, and the fourth reed is illustrated as D♯. The reeds which are positioned adjacent one another will be seen to be musically spaced apart a substantial amount so that there is no tendency for interaction. The notes which are musically adjacent to those illustrated in Fig. 6 will be understood to be produced by reeds positioned on one or the other of the two additional reed blocks of each reed compartment or octave box. Such disposition on different blocks both spaces the reeds apart, and places them on different physical supports to preclude mechanical coupling through the supports.

As will be evident, reeds producing different notes necessarily are different sizes in order to have the requisite vibrational frequencies. The reed frames necessarily are of somewhat different sizes to accommodate the reeds of different sizes, all as readily may be seen in Fig. 6. The reeds are positioned in the frames so that the vibratile tongues thereof will have their free ends positioned above the openings 114 in the block regardless of the sizes of reeds. The different reed sizes may require different dispositions of the tone screws 178 and it will be seen that the single illustrative example wherein there are three tone screws shows these three tone screws in association with a large reed.

Different parts of a reed vibrate in somewhat different manners, partially dependent upon the spacing from the fixed end of the reed, and partially dependent upon the thickness and configuration of the reed. Each reed may be deliberately made of non-uniform thickness throughout its length, and may be twisted and deformed from a plane to produce specific vibrational modes. Such forming of the reeds causes the reeds to produce vibrations at different positions along them corresponding to the various organ stops. The tone screws are precisely positioned relative to the specific reed portions to cause electrical oscillations corresponding to the various organ stops to be established, which oscillations are amplified by the electronic amplifying means and converted into audible organ tones by the loudspeaker.

The rounding off of the under surfaces of the screw heads allows them to be positioned precisely relative to the reeds for the optimum production of the various organ stop tones. This renders conventional shaping circuits for changing the original tones generated to produce organ stop tones unnecessary. Furthermore, the curved under surfaces of the screw heads allows the screw heads to be positioned more closely to the reeds than would be possible with flat or concave screw heads. This close spacing to the reeds makes the capacity between the reeds and the tone screws as high as possible. In addition, the curved configuration of the screw heads, while positioning the center portions of the screw heads adjacent the reeds, spaces the outer edges of the screw heads a substantial distance away from the reed frames and maintains the over-all capacity between the tone screws and reeds and frames at a minimum. The capacity between the tone screws and reed frames is fixed, while that between the tone screws and reeds varies with the vibration of the reeds. In accordance with the foregoing, the rounded or convex screw heads herein disclosed cause the variable capacity to be at a maximum while maintaining the fixed capacity at a minimum, thereby producing the utmost effect possible in generating organ tones.

Particular attention should be directed to the trumpet pick-ups 186. These pick-ups cooperate with the tips of the reeds to produce electrical oscillations corresponding to the trumpet stops of an organ. The broad tips of the noses on the trumpet pick-ups are wider than the tips 200 of the reeds so that if there should be any end play in the reeds, the reeds will still be adjacent the trumpet pick-ups and will have the same amount of capacity as if there were no end play. As readily may be seen in Fig. 10, the capacity field between a trumpet pick-up and its associated reed is between two relatively narrow edges. Consequently the area of the capacitor plates is relatively small, and the closest possible spacing is necessary to produce optimum results in tone generation and to produce maximum volume of the trumpet stop. The downward inclination of the nose of each trumpet pick-up allows the major portion of the trumpet pick-up to be spaced sufficiently from the reed frame for low fixed capacity, while the tip is positioned adjacent the reed for relatively high variable capacity. The recesses 120 having the reduced circular holes or openings 122 in the bottom thereof are provided for making such adjustment. As illustrated in Figs. 12 and 13, an adjusting tool 202 is provided having a shank 204 which is toothed or serrated at its lower end at 206. A reduced top or nose 208 projects beyond the serrations 206 and is adapted to fit in any one of the holes 122. The heads of the screws 192 holding the trumpet pick-ups in position may be of any desired type, and for illustrative purposes are illustrated as round headed screws having cross slots for receiving a screw driver. To adjust a trumpet pick-up, a screw driver 210 of the appropriate type is utilized to loosen the holding screw. The tool 202 then is positioned with the tip 208 thereof in the adjacent hole 122. This causes the serrations 206 of the tool to engage the side of the pick-up 186. Rotation of the shaft 204 of the tool causes the serrations 206 to shift the trumpet pick-up 186 in one direction or the other similar to a pinion and rack drive. During such driving the tool 202 generally frictionally drives the trumpet pick-up, but to some extent the serrations may actually bite into the metal of the trumpet pick-up. After the trumpet pick-up has been satisfactorily adjusted, the tool 202 is maintained stationary to prevent accidental shifting of the trumpet pick-up while the screw 192 is tightened by means of the driver 210. It will be understood that the trumpet pick-ups 186 fit in their respective grooves or recesses 118 sufficiently closely to prevent motion other than longitudinal, but not too tightly to preclude ready shifting by the tool 202.

The mounting of a plurality of reeds on a block, and the provision of a plurality of such blocks of reeds for each octave affords a unit construction which allows sub-assemblies to be fabricated and independently tested or adjusted, such as on a test bench. It further materially speeds the final assembly, and furthermore spaces the individual groups of reeds apart to preclude interaction amongst the reeds.

The reeds are easily slipped to and from place in the blocks for assembly and disassembly therewith, but are fixedly held in place by the screw attaching the electrical connector so that the reeds cannot possibly be shifted from their proper positions relative to their associated tone screws. This screw, of course, is readily loosened or removed when it is desired to remove a reed.

Various modifications of the specific structure shown and described for illustrative purposes are possible and form a part of the invention insofar as they come within the spirit and scope of the appended claims.

The invention is hereby claimed as follows:

1. In an electronic organ, a reed block comprising a base having raised portions thereon defining a plurality of recesses corresponding in number to and adapted to receive a plurality of reed frames and reeds no greater than substantially an octave in number, said base having a like plurality of apertures therethrough, each aligned with one of said recesses for passing air past a reed, means engaging said frames and said block for retaining said reeds and frames in said recesses, means for mounting said block on a support, and said block having means on said block for supporting pickup means cooperable with said reeds, said pickup supporting means comprising a raised portion extending transversely along corresponding edges of the reed frame and reed receiving recesses, said raised portion having recesses thereacross aligned with each of the reed and frame receiving recesses for receiving a pickup, said raised portion further having a socket adjacent each of said pickup receiving recesses adapted for cooperative engagement with a pickup adjusting tool.

2. In an electronic organ, a plate-like reed block comprising a substantially flat, plate-like base having raised portions thereon defining a plurality of open top recesses corresponding in number to and adapted to receive a plurality of reed frames and reeds no greater than substantially an octave in number, confronting projections on said raised portions overlying said base and providing tracks for slidingly receiving said plurality of reed frames and reeds with said frames substantially flat against said base, said base having a plurality of like apertures therethrough, each aligned with one of said recesses for passing air past a reed, means engaging said frames and said block for retaining said reeds and frames in said recesses, said block having means for mounting said block on a support, and pickup supporting means extending across said reed block at one end of said reed frame and reed receiving recesses, and having grooves therein receiving tab-like pickups spaced longitudinally from the free ends of the reeds.

3. In an electronic organ as set forth in claim 2, wherein the tab-like pickup means each comprises a body portion spaced substantially above the plane of the reed, and an active portion tapering inwardly from said body portion to a relatively narrow tip and inclined downwardly from said body portion to said tip with said tip juxtaposed to the free end of said reed.

4. The combination as set forth in claim 2 wherein the grooves in the pickup supporting means are equal in number to and respectively aligned with the reed receiving recesses.

5. In an electronic organ, a plate-like reed block comprising a substantially flat, plate-like base having raised portions thereon defining a plurality of open top recesses corresponding in number to and adapted to receive a plurality of reed frames and reeds, confronting projections on said raised portions overlying said base and providing tracks for slidingly receiving said plurality of reed frames and reeds with said frames substantially flat against said base, said base having a plurality of like apertures therethrough, each aligned with one of said recesses for passing air past a reed, means engaging said frames and said block for retaining said reeds and frames in said recesses, said block having means for mounting said block on a support, and pickup supporting means extending across said reed block at one end of said reed frame and reed receiving recesses, and having grooves therein receiving tab-like pickups spaced longitudinally from the free ends of the reeds.

References Cited in the file of this patent

UNITED STATES PATENTS

| | | |
|---|---|---|
| Re. 8,771 | Scribner | June 24, 1879 |
| 5,438 | Nutting | Feb. 8, 1848 |
| 107,755 | Burdett | Sept. 27, 1870 |
| 199,429 | Fuller | Jan. 22, 1878 |
| 335,700 | Hessler | Feb. 9, 1886 |
| 369,258 | Paillard et al. | Aug. 30, 1887 |
| 451,667 | Gilmore | May 5, 1891 |
| 1,541,067 | Palmer | June 9, 1925 |
| 2,015,014 | Hoschke | Sept. 17, 1935 |
| 2,113,347 | Hoschke | Apr. 5, 1938 |
| 2,175,354 | Lewin | Oct. 10, 1939 |
| 2,246,855 | Miessner | June 24, 1941 |
| 2,414,886 | Miessner | Jan. 28, 1947 |
| 2,503,100 | Dewhurst et al. | Apr. 4, 1950 |
| 2,519,976 | Phelon | Aug. 22, 1950 |
| 2,520,079 | Zuck | Aug. 22, 1950 |
| 2,577,580 | Hallman | Dec. 4, 1951 |
| 2,628,327 | Vilkomerson | Feb. 10, 1953 |
| 2,656,755 | Miessner | Oct. 27, 1953 |
| 2,687,862 | Crowther | Aug. 31, 1954 |
| 2,708,729 | Shull | May 17, 1955 |
| 2,721,976 | Wojciechowski | Oct. 25, 1956 |